United States Patent Office 3,385,872
Patented May 28, 1968

3,385,872
PROCESS FOR THE PREPARATION OF 3-HYDROXY - 19 - NOR - $\Delta^{1,3,5(10),9(11)}$ - TETRAENE STEROIDS
Francisco Alvarez, Palo Alto, Calif., assignor to Syntex Corporation, Panama, Panama, a corporation of Panama
No Drawing. Filed Aug. 29, 1966, Ser. No. 575,551
13 Claims. (Cl. 260—397.45)

ABSTRACT OF THE DISCLOSURE

Process for the preparation of 3-hydroxy-19-nor-$\Delta^{1,3,5(10),9(11)}$-tetraene steroids which have known uses from the corresponding 3-keto-19-nor-$\Delta^{4,9(10)}$-diene steroids.

---

This invention relates to a novel organic process by which useful steroid compounds are prepared. This invention specifically pertains to a novel process for the preparation of 19-nor-$\Delta^{1,3,5(10),9(11)}$-tetraene steroids.

Heretofore, one method by which $\Delta^{1,3,5(10),9(11)}$-tetraenes were prepared involved the introduction of $\Delta^{9(11)}$-unsaturation in the corresponding ring A aromatic compound via various procedures. United States Patent 3,258,471 describes another method by which these tetraenes are prepared involving the treatment of starting 3-keto-10-carboxy$\Delta^4$ steroids with at least two molar equivalents of chlorine, bromine, iodine, or similar source of halogen.

Now a process for the preparation of 19-nor-$\Delta^{1,3,5(10),9(11)}$-tetraene steroids has been discovered which process comprises treating a 3-keto-19-nor-$\Delta^{4,9(10)}$-diene steroid with about one molar equivalent of a positive halogen ion releasing agent, such as molecular iodine and the like, in the presence of a tertiary amine solvent, such as pyridine or like solvent.

The novel process thus embodied hereby is represented as follows:

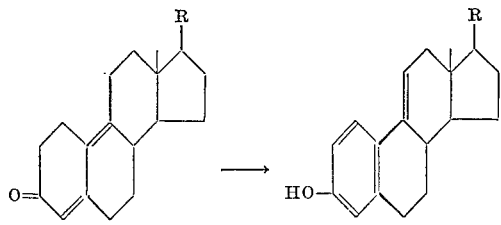

wherein
R is a keto group or the grouping

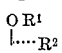

in which $R^1$ represents hydrogen, tetrahydrofuran-2-yl, tetrahydropyran-2-yl, cyclopentyl, or a hydrocarbon carboxylic acyl group containing less than 12 carbon atoms, and
$R^2$ represents hydrogen, lower alkyl, such as methyl, ethyl, propyl, butyl, hexyl, and the like, lower alkenyl, such as vinyl, allyl, and the like, or lower alkynyl (including halo-lower alkynyl), such as ethynyl, fluoroethynyl, chloroethynyl, bromoethynyl, propynyl, hexynyl, and the like or the grouping

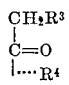

in which each of $R^3$ and $R^4$ represent hydrogen, hydroxy, a hydrocarbon carboxylic acyloxy group containing less than 12 carbon atoms, or when taken together with the 20-keto group, a 17α,20;20,21-bismethylenedioxy group.

The acyloxy and acyl groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminocetate, and β-chloropropionate.

In addition to the foregoing 17-substituents, the 3-keto-$\Delta^{4,9(10)}$-diene steroids which can be employed as starting materials in the process of the present invention can also contain other non-interfering substituents, e.g., keto groups or derivatives hereof, such as enolized or ketalized keto groups; hydroxyl groups or derivatives thereof, such as esterified or etherified hydroxyl groups and, in the case of a pair of hydroxyl groups, e.g., a 16α-hydroxy group and a 17α-hydroxy group, acetal or ketal derivatives; alkyl groups, i.e., methyl groups; halogen atoms, e.g., fluorine, chlorine, or bromine, and the like, at one or more of positions 1, 2, 4, 5, 6, 7, 8, 9, 11, 12 14, 15, and 16, and can belong to the estrane, pregnane, spirostane, cholane, cholestane, stigmastane or cardanolide series.

One method by which these 3-keto-$\Delta^{4,9(10)}$-diene steroids are obtained is described in Journal of the American Chemical Society 82, 2402 (1960), and involves the conversion of the corresponding 3-keto-$\Delta^4$ steroid to the 3-keto-$\Delta^{5(10)}$ compound followed by treatment thereof with a bromine containing reagent to give the steroidal diene product.

Particularly valuable starting steroids for the instant process are as follows:

estra-4,9(10)-diene-3,17-dione,
estra-4,9(10)-diene-17β-ol-3-one,
17β-tetrahydropyran-2'-yloxyestra-4,9(10)-dien-3-one,
17β-acetoxyestra-4,9(10)-dien-3-one,
17α-methylestra-4,9(10)-dien-17β-ol-3-one,
17α-methyl-17β-tetrahydropyran-2'-yloxyestra-4,9(10)-dien-3-one,
17α-ethylestra-4,9(10)-dien-17β-ol-3-one,
17α-butylestra-4,9(10)-dien-17β-ol-3-one,
17α-vinylestra-4,9(10)-dien-17β-ol-3-one,
17α-ethynylestra-4,9(10)-dien-17β-ol-3-one,
17α-chloroethynylestra-4,9(10)-dien-17β-ol-3-one,
17α-ethynyl-17β-acetoxyestra-4,9(10)-dien-3-one,
17α-ethynyl-17β-cyclopentyloxyestra-4,9(10)-dien-3-one,
17α-fluoroethynylestra-4,9(10)-dien-17β-ol-3-one,
17α-chloroethynylestra-4,9(10)-dien-17β-ol-3-one,
17α-bromoethynylestra-4,9(10)-dien-17β-ol-3-one,
17α-hexynylestra-4,9(10)-dien-17β-ol-3-one,
19-norpregna-4,9(10)-diene-3,20-dione,
19-norpregna-4,9(10)-dien-17α-ol-3,20-dione,
17α-acetoxy-19-norpregna-4,9(10)-diene-3,20-dione,
16α-methyl-19-norpregna-4,9(10)-diene-3,20-dione,
16β-methyl-19-norpregna-4,9(10)-diene-3,20-dione,
16α-methyl-19-norpregna-4,9(10)-dien-17α-ol-3,20-dione,
16α,17α-isopropylidenedioxy-19-norpregna-4,9(10)-diene-3,20-dione,
19-norpregna-4,9(10)-dien-21-ol-3,20-dione,
21-acetoxy-19-norpregna-4,9(10)-diene-3,20-dione,
19-norpregna-4,9(10)-diene-17α,21-diol-3,20-dione,
21-acetoxy-19-norpregna-4,9(10)-dien-7α-ol-3,20-dione,
17α,20;20,21-bismethylenedioxy-19-norpregna-4,9(10)-diene-3-one, and the like.

In the practice of this invention illustrated by the above depicted process, a starting compound is reacted in organic reaction medium provided by organic tertiary amine solvents, such as t-aliphatic amines, for example, trimethyl amine, diethylmethyl amine, dimethyl-n-butyl amine, triethyl amine, diethylisopropyl amine, and the like; t-alicyclic amines, for example, N-methylpyrrole, N-ethylpyrrole, N-methylpyrrolidine, 1,2-dimethylpiperidine, N-ethylpiperidine, and the like; and t-aromatic amines, for example, N,N-dimethylaniline, N,N-diethylaniline, N,N-dimethyl-o-toluidine, N,N-dimethyl-m-toluidine, N,N-dimethyl-p-toluidine, benzylmethylethyl amine, N,N-di-dimethyl-α-naphthyl amine, N,N-dimethyl-β-naphthyl amine, α-collidine, β-collidine, γ-collidine, 2,4-lutidine, 2,6-lutidine, 3,4-lutidine, quinoline, isoquinoline, α-picoline, β-picoline, γ-picoline, and the like, preferably pyridine, in the presence of about equal molar quantities (based upon the amount of starting steroid) of a positive halogen ion releasing agent, such as molecular chlorine, bromine, and iodine, N,N-dibromodimethylhydantoin, diiododimethylhydantoin, and N-bromo and N-iodo derivatives of (lower)aliphatic carboxylic acid amides and imides, such as N-chloroacetamide, N-bromoacetamide, N-iodoacetamide, N-chlorosuccinimide, N-bromosuccinimide, N-iodosuccinimide, and the like or appropriate mixtures thereof. Iodine is preferred. Thereafter, the product steroid is recovered from the reaction mixture via any of the conventional methods, such as extraction, evaporation, chromatography, and the like.

As mentioned hereinbefore, the positive halogen ion releasing agent is operative in carrying out the process of the instant invention when used in about equal molar quantities with the amount of starting compound employed. The amine will be employed in an amount sufficient to insure the complete dissolution of the steroid starting material, for example, an amount ranging from about 3 cc. to about 100 cc., and preferably from about 10 cc. to about 15 cc. per gram of steroid starting material. Inert organic co-solvents or diluents, for example, benzene, toluene, chlorobenzene, carbon tetrachloride, and the like, can also be present in varying amounts, if desired.

Temperatures ranging from about 20° C. to about 180° C. or more are operative in the instant process. Temperatures lower than room temperature can be used but undue lengths of time for the reaction may be required and special equipment may be needed. Temperatures above 180° C. can also be used but are generally unnecessary to sustain the reaction. Optimum temperature conditions are dependent upon the particular reactants employed therewith, but range generally between about 50° C. and 150° C. Reaction times vary from about 4 hours to 24 hours at atmospheric pressure depending upon choice of reactants and temperatures.

The following examples serve to further illustrate the manner by which this invention can be practiced; however, they should not be construed as limitations upon the overall scope hereof.

EXAMPLE 1

To a solution of 5 g. of estra-4,9(10)-diene-3,17-dione in 75 ml. of pyridine are added 4.7 g. of iodine crystals and this reaction mixture is then heated and maintained at reflux for 6 hours. Following the reaction period, the mixture is slowly poured into 1 liter of water, and the resulting mixture is then acidified by the careful addition of aqueous 30% hydrochloric acid thereto. Next, the acidified mixture is extracted with methylene chloride, and the resulting extracts are combined, washed twice with an aqueous 5% sodium thiosulfate solution and then with water, dried over anhydrous sodium sulfate and evaporated to dryness under reduced pressure, thus giving estra-1,3,5(10),9(11)-tetraen-3β-ol-17-one.

EXAMPLE 2

Ten grams of 19-norpregn-4,9(10)-dien-17α-ol-3,20-dione are dissolved in 100 ml. of pyridine containing 8.1 g. of iodine, and this reaction mixture is then heated and maintained at reflux for 6 hours. Following this reaction period, the mixture is treated as described in Example 1 above to give 19-norpregna-1,3,5(10),9(11)-tetraene-3β,17α-diol-20-one.

EXAMPLE 3

The procedure of Example 1 is repeated in every detail substituting the starting compounds listed under I below for the starting compound recited therein and affording in lieu of the final compound recited therein the requisite final compounds listed under II below:

I estra-4,9(10)-dien-17β-ol-3-one,
17β-acetoxyestra-4,9(10)-dien-3-one,
17β-tetrahydropyran-2′-yloxyestra-4,9(10)-dien-3-one,
17α-methylestra-4,9(10)-dien-17β-ol-3-one,
17α-ethynylestra-4,9(10)-dien-17β-ol-3-one,
17α-chloroethynylestra-4,9(10)-dien-17β-ol-3-one,
17α-ethynyl-17β-acetoxyestra-4,9(10)-dien-3-one,
19-norpregna-4,9(10)-diene-3,20-dione,
16α-methyl-19-norpregna-4,9(10)-diene-3,20-dione,
16α-methyl-19-norpregna-4,9(10)-dien-17α-ol-3,20-dione,
17α-acetoxy-19-norpregna-4,9(10)-dien-3,20-dione, and
17α,20;20,21-bismethylenedioxy-19-norpregna-4,9(10)-dien-3-one.

II estra-1,3,5(10),9(11)-tetraene-3β,17β-diol,
17β-acetoxyestra-1,3,5(10),9(11)-tetraen-3β-ol,
17β-tetrahydropyran-2′-yloxyestra-1,3,5(10),9(11)-tetraen-3β-ol,
17α-methylestra-1,3,5(10),9(11)-tetraene-3β,17β-diol,
17α-ethynylestra-1,3,5(10),9(11)-tetraene-3β,17β-diol,
17α-chloroethynylestra-1,3,5(10),9(11)-tetraene-3β,17β-diol,
17α-ethynyl-17β-acetoxyestra-1,3,5(10),9(11)-tetraen-3β-ol,
19-norpregna-1,3,5(10),9(11)-tetraen-3β-ol-20-one,
16α-methyl-19-norpregna-1,3,5(10),9(11)-tetraen-3β-ol-20-one,
16α-methyl-9-norpregna-1,3,5(10),9(11)-tetraene-3β,17α-diol-20-one,
17α-acetoxy-19-norpregna-1,3,5(10),9(11)-tetraen-3β-ol-20-one, and
17α,20;20,21-bismethylenedioxy-19-norpregna-1,3,5(10),9(11)-tetraen-3β-ol.

EXAMPLE 4

The procedures of Examples 1, 2, and 3 are repeated utilizing the positive halogen ion releasing agent listed below in about equal molar quantities with the amount of starting compound, in lieu of iodine with similar results in each instance.

bromine
N-chloroacetamide
N-bromoacetamide
N-iodosuccinimide

EXAMPLE 5

The procedures outlined in each of Examples 1, 2, 3, and 4 are repeated utilizing the tertiary amine solvents listed below in lieu of pyridine with similar results in each instance.

quinoline
β-collidine
2,4-lutidine
N,N-dimethylaniline

What is claimed is:
1. A process for the preparation of 3-hydroxy-19-nor-$\Delta^{1,3,5(10),9(11)}$ steroids which comprises reacting a 3-keto-19-nor-$\Delta^{4,9(10)}$ steroid with about one molar equivalent of a positive halogen ion releasing agent in an organic tertiary amine solvent.

2. The process of claim 1 wherein the starting steroid is selected from the group consisting of androstanes and pregnanes.

3. The process of claim 2 wherein the positive halogen ion releasing agent is selected from the group consisting of iodine, bromine, chlorine, N-bromoacetamide, and N-bromosuccinimide.

4. The process of claim 3 wherein the organic tertiary amine solvent is selected from the group consisting of pyridine, quinoline, and β-collidine.

5. The process of claim 1 wherein the reaction is conducted at a temperature of between about 20° C. and 180° C., the positive halogen ion releasing agent is iodine and the organic tertiary amine solvent is pyridine.

6. The process of claim 5 wherein estra-1,3,5(10),9(11)-tetraen-3β-ol-17-one is prepared from estra-4,9(10)-diene-3,17-dione.

7. The process of claim 5 wherein 17β-acetoxyestra-1,3,5(10),9(11)-tetraen-3β-ol is prepared from 17β-acetoxyestra-4,9(10)-dien-3-one.

8. The process of claim 5 wherein 19-norpregna-1,3,5(10)-9(11)-tetraen-3β-ol-20-one is prepared from 19-norpregna-4,9(10)-diene-3,20-dione.

9. The process of claim 5 wherein 19-norpregna-1,3,5(10)-9(11)-tetraene-3β,17α-diol-20-one is prepared from 19-norpregna-4,9(10)-dien-17α-ol-3,20-dione.

10. The process of claim 5 wherein 17α-acetoxy-19-norpregna-1,3,5(10),9(11)-tetraen-3β-ol - 20 - one is prepared from 17α-acetoxy-19-norpregna - 4,9(10)-diene-3,20-dione.

11. The process of claim 5 wherein 17α-ethylnylestra-1,3,5(10),9(11)-tetraene - 3β,17β - diol is prepared from 17α-ethynylestra-4,9(10)-dien-17β-ol-3-one.

12. The process of claim 5 wherein 17α-chloroethylnylestra-1,3,5(10),9(11)-tetraene - 3β,17β - diol is prepared from 17α-chloroethynylestra-4,9(10)-dien-17β-ol-3-one.

13. The process of claim 5 wherein 17α-ethynyl-17β-acetoxyestra-1,3,5(10),9(11)-tetraen - 3β - ol is prepared from 17α-ethynyl-17β-acetoxyestra-4,9(10)-dien-3-one.

References Cited

UNITED STATES PATENTS

| 3,258,471 | 6/1966 | Alvarez | 260—397.4 |
| 3,151,134 | 9/1964 | Denot et al. | 260—397.45 |

ELBERT L. ROBERTS, *Primary Examiner.*